US007646336B2

(12) United States Patent
Tan et al.

(10) Patent No.: US 7,646,336 B2
(45) Date of Patent: Jan. 12, 2010

(54) AUTOMATED ASSET POSITIONING FOR LOCATION AND INVENTORY TRACKING USING MULTIPLE POSITIONING TECHNIQUES

(75) Inventors: Han-Shue Tan, Concord, CA (US); Gregory Keith Warf, Fairfield, CA (US); Larry Henry, Berkeley, CA (US)

(73) Assignee: ContainerTrac, Inc., Emeryville, CA (US)

( * ) Notice: Subject to any disclaimer, the term of this patent is extended or adjusted under 35 U.S.C. 154(b) by 118 days.

(21) Appl. No.: 11/691,383

(22) Filed: Mar. 26, 2007

(65) Prior Publication Data

US 2007/0222674 A1    Sep. 27, 2007

Related U.S. Application Data

(60) Provisional application No. 60/785,585, filed on Mar. 24, 2006.

(51) Int. Cl.
*G01S 5/14* (2006.01)
*G01S 3/02* (2006.01)
(52) U.S. Cl. .............................. 342/357.02; 342/357.14
(58) Field of Classification Search ............ 342/357.02, 342/357.07, 357.14, 457
See application file for complete search history.

(56) References Cited

U.S. PATENT DOCUMENTS

| | | | | |
|---|---|---|---|---|
| 5,740,048 | A | 4/1998 | Abel | 364/443 |
| 5,780,826 | A | 7/1998 | Hareyama | 235/385 |
| 5,982,324 | A * | 11/1999 | Watters et al. | 342/357.06 |
| 6,266,008 | B1 | 7/2001 | Huston | 342/357.09 |
| 6,317,688 | B1 | 11/2001 | Bruckner | 701/213 |
| 6,408,245 | B1 | 6/2002 | An | 701/216 |
| 6,427,122 | B1 | 7/2002 | Lin | 701/214 |
| 6,445,983 | B1 | 9/2002 | Dickson | 701/23 |
| 6,449,559 | B2 | 9/2002 | Lin | 701/216 |
| 6,459,990 | B1 | 10/2002 | McCall | 701/220 |
| 6,516,272 | B2 | 2/2003 | Lin | 701/214 |
| 6,577,921 | B1 | 6/2003 | Carson | 700/214 |

(Continued)

FOREIGN PATENT DOCUMENTS

DE    100 23 586 A1    7/2001

(Continued)

OTHER PUBLICATIONS

International Search Report dated Oct. 16, 2008 for Application No. PCT/US2008/057748.

*Primary Examiner*—Thomas H Tarcza
*Assistant Examiner*—Fred H Mull
(74) *Attorney, Agent, or Firm*—Fliesler Meyer LLP

(57) ABSTRACT

A system and method is provided for tracking and maintaining a highly accurate inventory of shipping containers that are stored within container storage facilities. The invention includes using multiple complementary real-time and post-processing positioning techniques associated with various positioning sensors that are associated with inventory pieces or equipment. Examples of such positioning techniques are DGPS, GPS with RTK, DGPS loosely-coupled with INS, DGPS tightly-coupled with INS, and DGPS deeply-coupled with INS. Data correction and fusion techniques are applied to these positioning stages to re-compute a calibrated position with an improved accuracy. An additional trajectory can be iteratively determined using the fusing technique until the position data becomes statistically trustworthy. Further, combinations of multiple real-time positioning techniques combined with past position error correction algorithms provide a high accuracy needed for inventory tracking.

29 Claims, 6 Drawing Sheets

U.S. PATENT DOCUMENTS

| | | | |
|---|---|---|---|
| 6,611,755 B1 | 8/2003 | Coffee | 701/213 |
| 6,615,135 B2 | 9/2003 | Davies | 701/213 |
| 6,615,136 B1 | 9/2003 | Swope | 701/214 |
| 6,657,586 B2 | 12/2003 | Turner | 342/357.07 |
| 6,694,260 B1 | 2/2004 | Rekow | 701/214 |
| 6,697,736 B2 | 2/2004 | Lin | 701/214 |
| 6,728,637 B2 | 4/2004 | Ford | 701/213 |
| 6,731,237 B2 | 5/2004 | Gustafson | 342/357.06 |
| 6,766,247 B2 | 7/2004 | Mosis | 701/207 |
| 6,801,159 B2 | 10/2004 | Swope | 342/357.14 |
| 6,801,878 B1 | 10/2004 | Hintz | |
| 6,804,621 B1 | 10/2004 | Pedanckar | 702/94 |
| 6,810,324 B1 | 10/2004 | Nadkarni | 701/207 |
| 6,826,478 B2 | 11/2004 | Riewe | 701/220 |
| 6,853,687 B2 | 2/2005 | Harrington | 375/259 |
| 6,876,326 B2 | 4/2005 | Martorana | 342/463 |
| 6,879,875 B1 | 4/2005 | Hu | 700/213 |
| 6,957,143 B1 | 10/2005 | Nadkarni | 701/207 |
| 7,099,796 B2 | 8/2006 | Hamza | 702/150 |
| 2002/0019698 A1* | 2/2002 | Vilppula et al. | 342/357.08 |
| 2002/0062193 A1 | 5/2002 | Lin | |
| 2003/0078754 A1* | 4/2003 | Hamza | 702/150 |
| 2003/0184468 A1* | 10/2003 | Chen et al. | 342/195 |
| 2004/0198386 A1* | 10/2004 | Dupray | 455/456.1 |
| 2005/0065727 A1* | 3/2005 | Hu et al. | 342/358 |
| 2006/0224357 A1* | 10/2006 | Taware et al. | 702/179 |
| 2007/0010940 A1 | 1/2007 | Tan et al. | |

FOREIGN PATENT DOCUMENTS

| | | |
|---|---|---|
| GB | 2 323 989 A | 10/1998 |
| WO | WO 02/42881 A | 5/2002 |

* cited by examiner

AUTOMATED ASSET POSITIONING FOR LOCATION AND INVENTORY TRACKING USING MULTIPLE POSITIONING TECHNIQUES

CLAIM OF PRIORITY

This Patent Application claims the benefit of U.S. Provisional Application No. 60/785,585 entitled "AUTOMATED ASSET POSITIONING FOR LOCATION AND INVENTORY TRACKING USING MULTIPLE POSITIONING TECHNIQUE," by Tan et al., filed Mar. 24, 2006.

BACKGROUND

1. Technical Field

The present invention relates to tracking the precise location of assets by either tracking the equipment that moves them or tracking the assets themselves. More particularly, the present invention relates to the tracking and inventorying of containers, within container storage facilities, by combining multiple positioning techniques that involve using a satellite Global Positioning System (GPS), an Inertial Navigation System (INS), or other movement or status sensors for position determination.

2. Related Art

Position or location tracking is a crucial component of inventory or resource management systems. Location tracking systems can employ real-time positioning sensors that continuously or periodically provide position data for tracking the location of resources. These systems commonly acquire the locations of vehicles, equipment, or inventory based on principles of either triangulation or proximity with respect to known locations determined from sensors. Typical sensors used include Global Positioning System (GPS), Differential Global Positioning System (DGPS), Integrated Differential Global Positioning System and Inertial Navigation System (DGPS/INS), Real Time Locating System (RTLS), RTLS/GPS, RTLS/INS, transponders and ultra wideband locating systems. As one example, U.S. Pat. No. 6,577,921 discloses a container tracking system that tracks the real-time positions of the container handling equipment using both GPS and INS sensors.

Limitations in physics, however, generally prevent real-time positioning systems from achieving 100% reliability or accuracy. Examples of those limitations with respect to radiowave positioning include obstacles blocking line of sight position signals, or signals reflected from nearby surfaces (multi-path). Further practical limitations in sensor technologies include electromagnetic and other inherited noise and biases in measurements, as well as a poor signal to noise ratio resulting from environmental interference sources. These limitations result in common positioning errors such as inaccuracies, loss of position, or location drifts causing erroneous position or inventory data.

Even when more accurate real-time position data can be determined through a combination of sensors, data and methods, these solutions do not solve another important problem in the inventory and resource tracking environment, namely what happens when at least a portion of the real-time position sensor data is inaccurate, missing or is lost? As a simple example, a real-time positioning system based on an expensive integrated GPS/INS solution can drift away from the true positions when the system enters an area covered by less than four GPS satellites for a long period of time. In a typical inventory tracking environment, inaccurate location measurements, if not corrected in time, can propagate into widespread inventory location errors. This occurs especially when tracking the position of containers or vehicles in a warehouse, container yard, or rail yard where tracking signals are often blocked. Resultant errors then require manual correction. The correction of the corrupted inventory database can create delays and often expensive corrective measures in resource management and inventory controls.

It is desirable to provide a system that increases the accuracy of monitoring the real-time position of an object such as a cargo container. It is further desirable to improve the accuracy of inventory location monitoring when one or more sensors, such as a GPS sensor, is unavailable or highly inaccurate due to noise.

SUMMARY

Embodiments of the present invention provide an improved method to intelligently combine multiple sensing systems and multiple positioning algorithms to obtain and report real-time position data with improved accuracy. In addition to real-time position data, the embodiments also provide post processing correction in a timely fashion as multiple data signals are received.

The invention employs multiple positioning systems and positioning algorithms or techniques to provide the real-time position of an asset being tracked. Either individual assets or multiple assets can be tracked at the same time. Assets can be processed by sensors locally on board the asset or external to the asset, with locations for some assets being processed in a centralized server or processors. Examples of the positioning systems used include DGPS, DGPS with RTK correction, DGPS/INS integration, machine vision with map integration, ultra wideband positioning system and RTLS. Different positioning methods, such as loosely-coupled DGPS/INS, tightly-coupled DGPS/INS, deeply-coupled DGPS/INS, DGPS integration with motion sensors, DGPS integration with dead-reckoning, GPS integration with RTLS as well as position error correction algorithms can also be used to provide one or more of the positioning techniques to improve the raw position data accuracy and provide motion data. The multiple position data of one or more assets can be stored in a data storage medium through wired or wireless communication.

Embodiments of this invention purposely include complementary and redundant algorithms to increase accuracy of sensor data. A position fusion or refining algorithm uses appropriate mathematical, statistical, or logical formulas to compute a new calibrated real-time position using the position data from multiple sources to result in a more accurate position than individual positioning systems can provide. The position fusion algorithm is intended to take advantage of the strength of some positioning techniques to compensate for the weaknesses of others. It will correlate linear and angular data using model-based or statistical analysis or heuristic approaches. It can use the stored movement history or external dynamic information to modify or identify the statistical properties or the confidence level of each position data point received, or to support the re-computation of a new real-time position. Some embodiments further allow the employment of positioning algorithms with different parameters but the same set of sensors to explore the inherited advantages of each different position integration algorithm.

Errors in the calibrated real-time position data according to embodiments of the present invention can be identified by first generating a new trajectory that best depicts the past movement of the mobile asset using the stored position data. The new trajectory is iteratively adjusted until a segment of the past trajectory is trustworthy. The past position errors are identified by comparing the original stored calibrated position data with the iteratively determined trustworthy new trajectory.

Other available information is further used to support the determination or computation of a more accurate real-time position or more trustworthy past movement history. In one embodiment, a digital map of the storage facilities is used to improve the accuracy of the real-time position data or the adjusted past trajectory. In another embodiment data relating to the moving asset can be used to improve the accuracy of any corresponding position data, including detection sensor outputs indicating that the asset is arriving at a specific location, or RFID type or other on-board sensor outputs indicating a specific operation is performed or the identification code of the asset has been accessed.

The calibrated position data, in one embodiment, is then updated and continuously corrected to provide revised position data from the adjusted trustworthy past trajectory. The system can continuously identify storage location errors. The system can provide the error correction data list to a database, report the inventory location errors, or simply update the inventory.

In sum, RF positioning systems, such as GPS systems, can suffer from multi-path and blockage, and most complementary integration systems, such as GPS/INS systems, can drift away from true positions when losing GPS satellites for a long period of time. Using embodiments of the present invention to provide real-time and post processing of location data, correction for the noise or errors can be enabled. For example, post-processing can clearly identify the equivalent noise and drift terms in INS data collected after a GPS system that was inoperative has regained sufficient coverage. The post-processed positioning technique can fit the INS position solutions with respect to the segments of the "good" GPS data to accurately locate inventory in the "bad" GPS coverage areas, and resolve trustworthy past position locations even in the "bad" GPS coverage segments. The combination of multiple positioning sensor systems and the iterative application of the post-processing error correction algorithms creates a highly accurate positioning system for a reliable asset and inventory tracking system.

BRIEF DESCRIPTION OF THE DRAWINGS

Further details of the present invention are explained with the help of the attached drawings in which.

DETAILED DESCRIPTION

Figure 1:
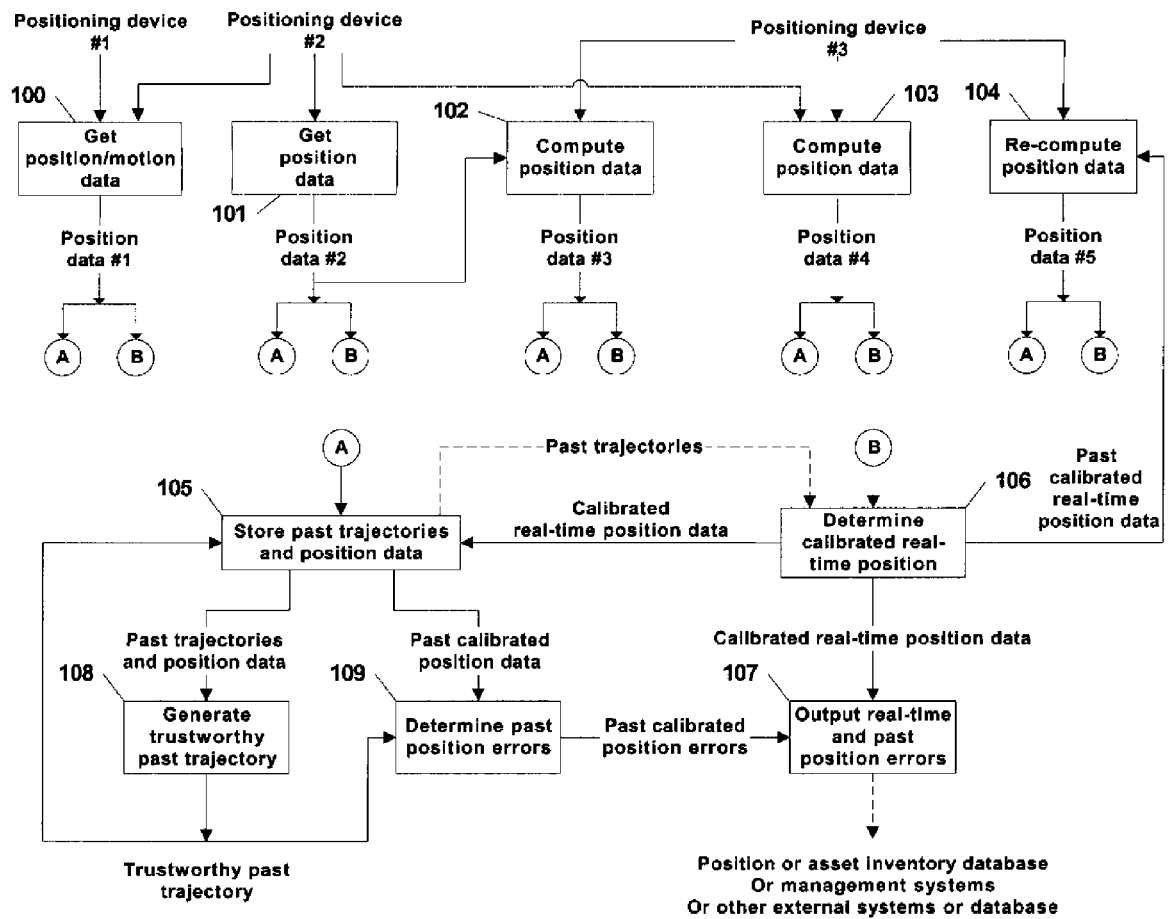
FIG. 1 is a flowchart illustrating basic operation of a method used in embodiments of the present invention for tracking real-time positions and correcting past position errors using multiple positioning techniques.

FIG. 1 is a flowchart illustrating basic operation of a method for integrating real-time positions and correcting past trajectory of a mobile object using multiple positioning techniques. Initially in FIG. 1, real-time position data is computed in step 100, step 101, step 102 and step 103 from positioning devices #1, positioning devices #2 and positioning devices #3. For example, a first embodiment may select an INS system for positioning devices #1, a DGPS system for positioning devices #2, and motion sensors for positioning devices #3. A second embodiment may choose a different set of positioning devices, such as an integrated DGPS/INS system for positioning devices #1, a DGPS system with RTK correction for positioning devices #2, and RTLS (Real-Time Locating System) for positioning system #3. The positioning devices #1, #2 and #3 can be complementary and/or redundant. It is understood that an individual embodiment may have different numbers of positioning devices as well as provide different numbers of position computing techniques.

The sensor data from those position devices are further processed using various positioning techniques in step 100, step 101, step 102, step 103 and step 104. Designers of position sensing systems first select sensor systems and then devise the multiple positioning techniques and algorithms. The positioning techniques can be complementary and/or redundant so that a higher confident final real-time position can be intelligently calibrated collectively from the data described above. As an example, in a first embodiment, step 100 can employ tightly coupled DGPS/INS integration filters, step 101 can provide DGPS data using the receiver software from the GPS manufacturer, step 102 can provide a DGPS/motion sensors integration using an ad hoc algorithm, step 103 can use a different algorithm for DGPS/motion sensors data fusion, and step 104 can apply a dead reckoning integration calibrated by past position data with a high confidence level. As a second example, the positioning techniques can include loosely coupled DGPS/INS integration filters, receiver's DGPS with RTK algorithm, RTLS with DGPS validation algorithm, RTLS/DGPS data fusion method, and RTLS recalibration based on past position data for the steps 100-104, respectively. Part of or all of the position data obtained from the steps 100-104 are provided to a past trajectory and position database in step 105. It is understood that attitude data and motion data can be part of the position data obtained and stored.

To overcome position accuracy limitations, conventional positioning systems employed the complimentary sensors with integration methods to improve accuracy and reliability as described with respect to steps 100-104. Such integration methods used an algorithm or a set of filters (typically some variations of Kalman filters) that follow one set of mathematic or statistical formula to generate one "optimal" position solution based on a set of specific parameters under a set of specific conditions. However, a common limitation of using a Kalman filter is the stringent requirement on precise a priori knowledge of the system models and the noise properties. Errors in the system models and noise properties may result in the filter being suboptimal. In addition, most sensor integration or fusion methods do not explore the inherit advantages of multiple integration and computation methods or algorithms. Embodiments of the present invention, therefore use the complementary sensors sources and combine and cross-examine data from these multiple sources with multiple integration methods to collectively produce a position that is more accurate or more reliable.

To provide a combined data output according to embodiments of the present invention, the real-time position data from steps 100 through 103 and re-computed position data from step 104, and in one embodiment past trajectories data from step 105, are provided to step 106. Step 106 determines a calibrated real-time position using a combination of one or more data correlation and association methods or data fusion filters. Although position data using techniques in steps 100-104 that is provided to step 106 are already the product of optimal filters, or a specific data fusion technique, they often still have multiple components of noise and contain erroneous data. Subsequently described techniques of embodiments of the present invention are provided to overcome this limitation and to improve positioning accuracy and reliability by filtering or fusing data from various sensor systems and techniques.

In one embodiment for reducing noise in step 106, data association and filter methods, such as probabilistic data association methods, fuzzy logic rules, or rule-based voting or selection, are used to produce a candidate position list. The filter methods continuously generate, estimate or confirm the associated probability measures of each position data set for the list. In some embodiments, several recursive state estimation filters, such as Extended Kalman Filters or particle filters can be used to update state probability density functions, and compute expected candidates' positions. A position correlation module, using rule-based methods or learned classifiers, can also be employed to decide whether to use or how to prioritize various position data by examining filter consistency, as well as matching data with rules and known features.

In a data fusion method, a combination of techniques can be selected to generate an improved real time position. In one embodiment, the data fusion method may be a simple weighted summation or voting selection based on data priorities or probabilities. In another embodiment, the method can be a mathematical formula, such as multiple-mode Kalman filter, or a knowledge-based method, such as a fuzzy logic set or neural network.

The output of step 106 is a new real-time position that is of equal or better quality in either accuracy or reliability than that of any position data from an individual positioning technique. In some embodiments of step 106, a position validation process is applied to the preliminary position output using methods similar to those for data association and correlation to check the validity of the preliminary calibrated real-time position. Iterative computation may occur if the preliminary calibrated real-time position fails the test.

In one embodiment, the past trajectories data from step 105 may be considered in determining a calibrated real-time position in step 106. To accomplish this, calibrated real-time position data determined in step 106 is stored to provide the past trajectories and position database in step 105. As indicated above, the past calibrated real-time position data determined in step 106 or other past position data with high confidence level stored in step 105 can be provided to step 104 where position data is re-computed using one or more of the before mentioned methods. The re-computed position data derived in step 104 from real time data is forwarded to the past trajectories and position database in step 105 for potential use in later calculations/considerations of determining most accurate past trajectories/positions. Also, the calibrated real-time position data from step 106 is forwarded to step 107, typically in a real-time fashion, for output to a Position or Asset Inventory Database; or Management Systems; or other External Systems or Databases for later use as past data.

In step 108 a trustworthy past trajectory is continuously generated using mathematical filters or estimation formulas. The trustworthy past trajectory from step 108 is also stored in the past trajectories and position database in step 105. In one embodiment of step 108, a new past trajectory is continuously generated as new data is received in step 108. The past trajectory is generated by adjusting parameters indicating model uncertainties and noise characteristics in a set of filters (such as some form of Kalman filters) using past position data in order to achieve a trajectory with a high confidence level. Such past trajectory is repeatedly examined, segment by segment, using certain statistic or rule-based formulas until one segment becomes statistically trustworthy. The segments forming the trajectory then become a past trustworthy trajectory. Such a statistical standard is typically achieved when "both ends" of the trajectory segment contain high confidence past position data; and at the same time, the model based trajectory matches well with the high-confidence data on both ends.

In another embodiment of step 108, a new past trajectory is generated by first aligning multiple past position data with each other, comparing a-priori statistical properties, and conforming to known constraints in order to select high-confidence position sections. The trustworthy past trajectory in a low-confidence position section is identified by the following steps: first choosing initial position within the high-confidence section; then manipulating the appropriate position and motion data in the low-confidence sections following mathematic rules and using appropriate filter (model) formulas; and finally examining the degree of error propagation when the position generated by the filter (model) converges in the high-confidence sections surrounding the low-confidence section. When such data manipulation results in a new past trajectory segment that preserves the same high-confidence characteristics in the high-confidence sections and maintains acceptable dynamic behaviors within the low-confidence section, this segment becomes a candidate of a past trustworthy trajectory. Follow-up mathematical or statistical confidence tests will be performed to re-confirm this process. It is also understood that other post-processing or data matching and association principles can also be used for other embodiments of generating past trustworthy trajectory.

Once a segment of the past trajectory becomes trustworthy in step 108, this segment of the data will be compared in step 109 to the corresponding past calibrated real-time position data stored in step 105. Whenever the position error between the past calibrated real-time position and the corresponding past position in that trustworthy segment of the past trajectory is larger than certain predetermined threshold, an error in the past real-time calibrated position is identified. The identified past calibrated position errors or messages indicating such errors, are forwarded to step 107 to be output to a position or asset inventory database, or management systems.

Figure 2:
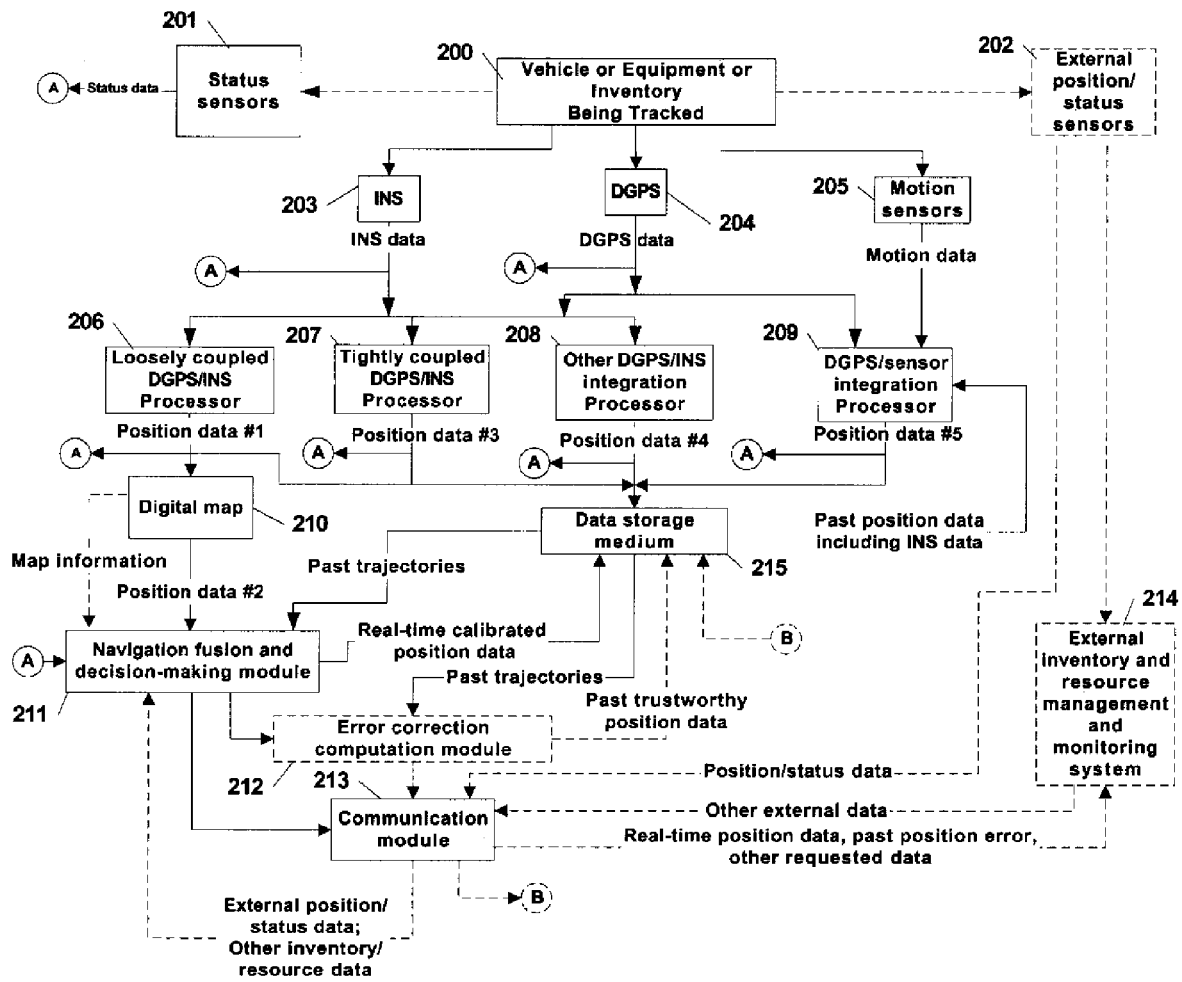
FIG. 2 is a block diagram of components used in embodiments of the present invention for tracking real-time positions and correcting past position errors of a mobile object using multiple positioning techniques with DGPS, INS and motion sensors.

FIG. 2 is a block diagram of components of a system for embodiments of the present invention used for tracking real-time positions and correcting past position errors of a mobile object using multiple positioning techniques with DGPS, INS and motion sensors 203-205 and incorporating the use of a digital map 210. In some embodiments, there may also be a status sensors 201. The status sensors 201 provide indications or acknowledgement of events such as the act of picking up or discharging inventory. An example where the status sensors 201 is useful is in a seaport where a top pick handler picks up a shipping container from a stack of containers and places that container on the chassis of a truck for transport within or away from the seaport. A sensor switch on the 5$^{th}$ wheel of a utility truck or street truck can be used as one of the status sensors 201 to detect the engagement or disengagement of a chassis transporting a shipping container or break bulk materials in a seaport or other inventory storage area. Another example of the status sensors 201 might be stationary or fixed sensor activators that excite sensors on board container processing equipment passing through a gate or near a checkpoint.

In operation, the real-time position information is obtained from a first sensor system—INS system 203, a second sensor system—DGPS system 204, a third sensor system—motion sensors 205. An example of the motion sensors 205 is a combination of speed sensor, compass and a steering angle sensor. Although the first sensor 203 is shown as an INS system, the second sensor 204 is shown as a DGPS system and the third sensor 205 is shown as a set of motion sensors, it is understood that other positioning and motion sensors can be used for alternative embodiments of the present invention, and that there is no restriction on the number of the sensors or sensor systems used in any embodiment as long as they generate at least two sets of position data with certain complementary characteristics. For example, accelerometers or laser/RF/magnetic/optical distance detectors can be used. Further an altimeter, compass, speed, or magnetometers might be used. Similarly sensors to detect signals from stationary or mobile transmitters, such as magnetic, laser, LIDAR, RF beacon transmitters, or pseudo-light pseudo-noise transmitter beacons, located throughout a container yard can be used and provided in a mobile sensing system with or without the support of a digital map. Further, it is contemplated that a single sensing system, such as an integrated DGPS/INS system could be used alone since such a sensing system can generate different sets of position data.

The DGPS system 204, INS system 203 and motion sensors 205 can be located on an item tracked 200 (e.g., a vehicle, a container, etc.), or be located remotely with sensors detecting the position of the item tracked 200. The integration of the Differential GPS unit 204 and INS unit 203 are shown as a tightly coupled DGPS/INS system, with positions and trajectories determined in a combined processor 207. The integration of the DGPS unit 204 and INS unit 203 are also shown providing a loosely coupled integration as determined in processor 206. The DGPS unit 204 and INS unit 203 can be combined in yet another DGPS/INS integration computing module 208. The DGPS unit 204 can be combined with data from a motion sensor 205 in module 209. The real-time position solution modules 206-209 can also be supported by an additional digital map module 210 as shown or other motion sensors 205 such as a speed sensor and compass. In some embodiments, the position data "generators" 206, 207, 208, 209 and 210 are simply computational modules that reside in one processor; in other embodiments, they can reside in more than one processor.

In FIG. 2, INS data from INS system 203 and GPS data from DGPS system 204 are combined in the loosely coupled DGPS/INS computation module 206 to provide a loosely coupled DGPS/INS solution as position data #1. In some embodiments, this position data may include x, y, z locations, orientations of the tracked item 200, and INS states. The position data may also include indexes or numbers indicating the associated confidence levels of the data, statistical properties of the state estimations as well as the operational conditions of the INS and DGPS sensors 203 and 204. The position data #1 from a loosely-coupled DGPS/INS module 206 is provided to a digital map module 210 and also to the navigation fusion and decision making module 211.

In the digital map module 210, position data #1 from the loosely-coupled DGPS/INS module 206 is associated with and compared with digital map information of the associated working environment; such as a corridor, under the crane, alongside a ship or barge, a road, a designated track, or inventory layouts with respect to a warehouse, a seaport container yard or other inventory storage facility. The incorporation of the digital map data and position data #1 results in a higher confidence position location in the form of position data #2 output from map module 210. Position data #2 from the digital map module 210 is forwarded to the navigation fusion and decision making module 211. In another possible embodiment, the digital map module 210 also provides relevant digital map information to the navigation and decision making module 211 to support the determination of the calibrated position data.

The loosely-coupled DGPS/INS integration method used in step 206 typically treats GPS and INS as two independent navigation systems with two decentralized filters. The position and velocity estimates obtained from the GPS filter are used as observations in the INS filter. With smaller state vectors and simpler equations, it is easier to implement, faster to initialize, and easier to include an ad hoc integration method with other sensors. However, it generally provides a sub-optimal solution with higher noise content.

A tightly coupled DGPS/INS computation module or system 207 is therefore added to complement the loosely-couple method. In one embodiment, the tightly coupled integration method uses raw GPS measurements, such as pseudorange and Doppler, and combines them with the INS measurements in the integrated centralized Kalman filter to provide an optimal navigation solution. In another embodiment, computation module/system 207 can be a deeply (or ultra tight) coupled DGPS/INS algorithm where INS derived information is used to aid GPS receiver signal tracking and acquisition.

The DGPS/INS integration computational module 208 uses another integrated algorithm, such as a tightly coupled DGPS/INS algorithm with different parameters, or a loosely coupled DGPS/INS algorithm with additional motion sensors or under different constrained equations, or an ad hoc DGPS/sensor integrated algorithm incorporating fuzzy logic or neural network, or a multiple-mode Kalman filter integration using several maneuver models, to provide another set of position data.

Another DGPS/Sensor integration computational module 209 utilizes past position data from the data storage medium 215 along with DGPS data from DGPS system 204 and motion data from motion sensors 205 to compute position data #5. In one embodiment, the computation module 209 includes a dead-reckoning integration using a recent high-confidence past position data that is stored in the storage medium 215. The past position data from the data storage medium 215 can include filtered INS data from the computation modules 206, 207, or 208, or the direct INS data from these modules. In another embodiment, the computation of the position data from module 209 can be iterated using data from storage medium 215. The resultant position and the motion data from all the computation modules or positioning systems 206, 207, 208, 209 and 210 are sent to the navigation fusion and decision-making module 211 and the data storage medium 215 for further processing and storage.

To determine an absolute location of an object, GPS position data is normally used. As a backup, INS or gyro velocity values are compared with last known GPS position data used to determine comparison velocity vectors. If GPS data fails, the gyro velocity values are used and referenced to the GPS information before failure. Any position corrections are made after the more reliable GPS position reference data returns to active. Accelerometer data can likewise be used to determine position by integrating the acceleration data to determine a velocity. The velocity information derived from acceleration data is then used alone or in conjunction with INS gyro velocity data to complement the GPS information to determine position.

A variety of different combinations of GPS and INS, or other sensors are used in embodiments of the invention. Loosely coupled or tightly coupled or deeply coupled data are combinations derived using a different mix of data from GPS, INS or other position indication data using different sets of mathematical formula, filter equations or constraints. Each different method generates an integrated position data with certain different characteristics. Some computational positioning methods rely heavily on INS data integration and use GPS data primarily for position initialization and the estimation of the INS bias and noise components such as tightly-coupled GPS/INS schemes. Some methods use INS to aid GPS computation such as deeply-coupled GPS/INS schemes. Other methods use INS data to support dead-reckoning only when GPS data is not trustworthy. Another embodiment will use a digital map to support GPS. Some methods generate data with very slow initial convergent rates but have a high ability to survive through a long period of GPS loss. Others recover fast after a period of GPS data loss but can easily drift to a bad position when GPS conditions are not sufficiently good.

Embodiments of this invention explore the advantages of the different computational algorithm methods and/or sensor systems by choosing the complementary algorithm methods and/or sensor sets and using them together. Algorithms select from the better method or combine methods to provide "better" real-time position data in the navigation fusion and decision-making module 211. Position information is represented in the form of GPS position indications in one embodiment, but alternatively can be represented using velocity, including both linear and angular velocity values, or it can include attitude data such as heading angle, or the yaw, roll and pitch angles of the item being tracked. Although it is not necessary, some embodiments include confidence levels as well as statistical properties in the position data.

The navigation fusion and decision-making module 211 receives data from various positioning systems and/or computation modules 206, 207, 208, 209 and 210 to generate real-time calibrated position data that is more accurate or more reliable than the original position data received. In one embodiment, the data used by module 211 includes some past position data stored in the storage medium 215. In module 211, multiple data are analyzed for their statistical properties, filter consistency, and data correlation. The resultant data confidences, as well as data priorities are used to determine the data fusion method for generating the calibrated position data in a real-time fashion as described in step 106 of FIG. 1. Further, the resultant real-time calibrated position data from module 211 is sent to the error correction computation module 212 for further processing.

The data storage medium 215 in FIG. 2 can be a memory device alone, or further include a display for reporting position data and error information. A communications module 213 may be a memory controller, or a more complex processor used to provide data to and from the data storage medium 215. The communications module 213 receives the calibrated real-time position data from the navigation fusion and decision making module 211, and provides data from external sources to the navigation fusion and decision making module 211, and to the data storage medium 215 if necessary.

In one embodiment, the communication module 213 passes external position/status data and other inventory/resource data to the navigation fusion and decision-making module 211 to be used in its internal computation and decision-making process. The communication module 213 can also pass real-time position data, past position errors and other requested data to an external inventory and resource management and monitoring system 214. The monitoring system 214 can be a seaport terminal operation system (TOS) or terminal management system (TMS). The external system 214 can receive inputs from external position/status sensors, such as a Real Time Locating System (RTLS), RFID tags, RFID triangulation data (one form of RTLS), optical character recognition cameras and servers, manual human entry via remote data terminals, or a speed or distance traveled sensor. The RTLS information or other external location data, if in real-time, can be provided as position data #6 (not shown) to module 211 and saved in the data storage medium 215. If RTLS information is not real-time, although not shown in FIG. 2 it can be sent to the data storage medium 215 and used as another set of past data in the navigation fusion and decision-making module 211, as well as in determining the past trustworthy trajectories in the error correction computation module 212.

The external inventory and resource management and monitoring system 214 can also provide other external data back to the communication module 213, to be forwarded to the navigation fusion and decision making module 211. Those external data can include current operating rules for equipment or inventory, inventory storage information and identification codes, current storage information such as storage height, row or aisle number, surrounding environment that can cause movement blockage, a dynamic map of current inventory, or positions of near-by vehicles or equipment.

In one embodiment, an error correction computation module 212 is provided to correct errors in the past position data. The error correction computation module 212 can be formed from a processor, or logic configured for performing the needed tasks, such as an FPGA (field-programmable gate array). The error correction computation module 212 can be combined with the navigation and decision making module 211 in one embodiment of the present invention. It is also understood that the computation modules 212, 211, and sensor signal processors 206, 207, 208, 209, 210 can reside in the same processor, or distributed in several processors or logic units. The error correction computation module 212 may also internally include memory and computation sub-modules performing tasks to correct position errors as described subsequently.

The error correction computation module 212 uses the past trajectories and position data from the data storage medium 215 to iteratively compute a segment of past trajectory using appropriate post-processing methods until an acceptably confident level is reached. Embodiments may use different post-processing techniques such as noise identification and filtering, Kalman filters, decision logics, knowledge-based learning, trajectory matching, or any combination of the above techniques to derive a segment of trustworthy past trajectory. Once a segment of trustworthy trajectory based on the past position data is realized, this segment of the trustworthy past trajectory is compared to the corresponding segment of the past real-time calibrated position data stored in the data storage medium 215 to determine the errors in the reported past real-time position data using methods similar to the steps described in the step 109 in FIG. 1. The trustworthy past trajectory can be stored in the data storage medium 215 for future use. Past position errors or messages indicating error correction from module 212 are sent to the communication module 213, and then to an external inventory and resource management and monitoring system 214, for correcting both past position and inventory errors.

Figure 3:
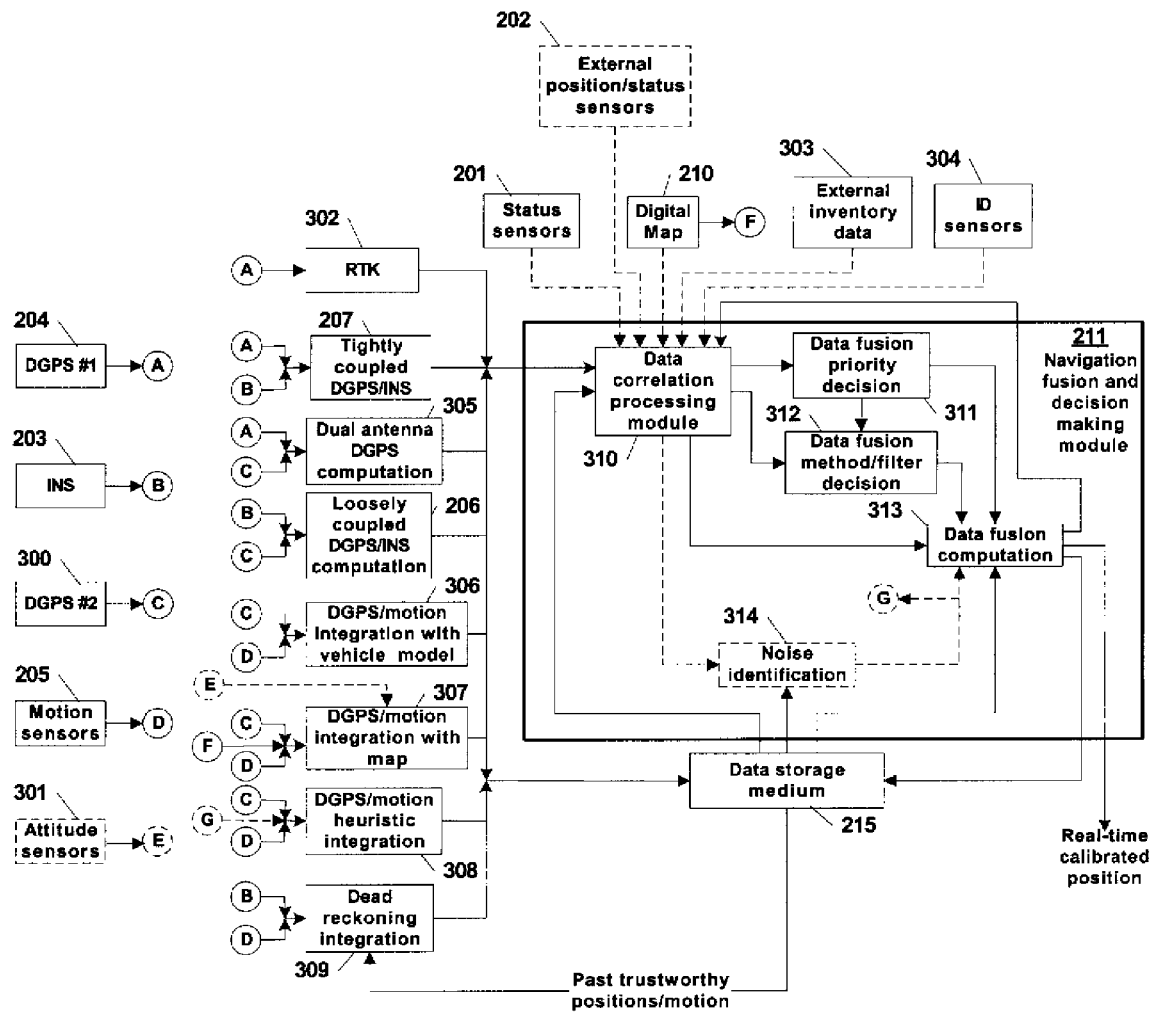
FIG. 3 shows a block diagram of the components used in embodiments of the present invention for computing calibrated real-time positions using multiple positioning techniques involving DGPS, INS, motion sensors and other digital data.

FIG. 3 is a block diagram of one embodiment of components used for computing calibrated real-time positions with multiple positioning techniques involving DGPS, INS, motion sensors and other digital data. One key concept of the navigation sensor fusion and decision-making module of this invention is the application and extension of the intelligent Multi-Sensor Data Fusion (MSDF) techniques. The MDSF techniques not only use a variety of position sensors but also use multiple positioning algorithms. In many embodiments multi-stage MSDF applications are integrated with intelligent decision-making and filters.

In FIG. 3, a variety of positioning systems is represented by the first DGPS system 204, a second DGPS system 300, an INS system 203 and motion sensors 205; and in one embodiment, the addition of attitude sensors 301. These positioning systems are integrated by various computation modules represented by: the GPS with RTK (Real-Time Kinematic) differential correction 302, the tightly coupled DGPS/INS computation 207, dual-antenna DGPS computation 305, loosely coupled DGPS/INS computation 206, DGPS/motion integration with vehicle model 306, DGPS/motion integration with map 307, DGPS/motion heuristic integration 308, and dead reckoning integration 309. It is understood that these computation modules can reside in the same processor as the navigation fusion and decision-making module 211, or they can be distributed in several processors or logic units, or some of them may be part of an integrated position sensor unit. Additional possible input data to these computation modules is obtained in the form of digital map data from 210, or past position/motion data from the data storage medium 215, or identified noise data from the noise identification module 314.

RTK correction 302 receives the carrier phase information from the base station to support integer ambiguity computation and results in high GPS (relative) position accuracy. The tightly coupled DGPS/INS module 311 generates an optimal position solution based on the raw GPS measurements and INS measurements in a centralized Kalman filter. The dual-antenna DGPS computation 305 uses two sets of GPS measurements along with known antenna geometry for highly accurate attitude measurements. The loosely coupled DGPS/INS computation module 206 generates an integrated position with decentralized Kalman filters using data from DGPS #2 system 300 and INS system 203. In one embodiment, DGPS/motion integration with vehicle model computation module 306 integrates motion sensors and DGPS data using filters based on the vehicle static or dynamic model. Motion sensors may include but not be limited to steering angle, throttle position/angle, speed sensors (Doppler, radar, engine/transmission tooth-wheel pickups), braking sensors, or distance traveled indicators.

In the DPGS/motion integration with map module 307, in one embodiment, a more complex position solution is derived utilizing inputs from DGPS #2 300 and motion sensors 205. The sensor data in map module 307 is compared with map data from the digital map 210. In another possible embodiment with map module 307, the addition of input from attitude sensors 301 provides vehicle/inventory orientation information to be included in the subsequent computation algorithms. Attitude sensors may include devices such as a magnetic, gravitation based, or motion-sensor integrated compass.

The DGPS/motion heuristic integration computation module 308 computes position data with inputs from DGPS #2 300 and motion sensors 205 utilizing a combination of heuristic computational algorithms. Candidate heuristic algorithms may include heuristic fuzzy filtering, asynchronous data fusion, heuristic estimation, extended Kalman filters, model based and heuristic sensor based particle filters. In another possible embodiment, the integration module 308 can use utilize identified noise from the noise identification module 314 to iteratively recalculate position until a high level of confidence is derived.

A dead reckoning integration computation 309 is made using measurements from INS 203, motion sensors 205, and past trustworthy position/motion data from the data storage medium 215. A dead reckoning integration computation can be made in the presence or absence of any or all of the computations above for the purpose of validating gross computational errors in any of the above processes due either to: a) the loss of sufficient sensor data input (because of blockage, operating environment such as between walls, under the hook of a crane or adjacent to obstacles shadowing DGPS or differential broadcast reception) to allow the other computations to be effectively performed, or b) in the presence of an equipment malfunction or total failure of DGPS or RTK systems.

Multiple position data from the above-mentioned computational modules are forwarded to the navigation fusion and decision-making module 211 and data storage medium 215 for subsequent processing and storage. It is understood that FIG. 3 provides only an example embodiment of fusing multiple positioning techniques. Other embodiments may employ more positioning algorithms and/or systems, or many may use less. It is also understood that, for some embodiments using different sets of positioning sensors, or additional positioning techniques or algorithms that are suitable for processing these data can be used. A key element of the embodiment shown in FIG. 3 is to select a sufficient number and types of the complementary techniques that can cover as many sensor conditions, operational scenarios, and position error distributions as possible. The fused final position will have reduced uncertainties, removed noises, tolerated sensor failures and increased accuracy. FIG. 3 shows one possible embodiment of the navigation fusion and decision-making module 211 consisting of four main sub-modules: data correlation processing module 310, data fusion priority decision module 311, data fusion method/filter selection module 312, and data fusion computation module 313. It is understood that some embodiments may not be organized with the same sub-modules but contain similar functionalities.

In FIG. 3, data correlation processing module 310 first receives real-time positioning data input from the computation modules 302, 207, 305, 206, 306, 307, 308, 309 as described above and performs analysis or applies algorithms to the data. The analysis uses selected statistical and logic methods, such as statistical testing, probability analysis, fuzzy logic rules, data and trajectory association, data alignment and pattern recognition processing, heuristic estimation, data and model association. The outcome or results of the data correlation module 310 can be: indexes depicting the identified confidence levels, numbers indicating the significances of each data set, and/or estimated statistical properties associated to each position data solution. These results are then passed on to data fusion priority decision module 311, and data fusion method/filter decision module 312 for further processing. In some embodiments, the past high-confident or trustworthy data from data storage medium 215 is also used to support data correlation processing. Since a number of data correlation processes either identify or validate certain noise content in the data set received, in one embodiment, a noise identification module 314 is included. The noise identification module 314 takes advantage of the existing filter equations either in the data correlation processing module 310, or in the data fusion computation module 313.

In additional embodiments, combinations of input data may be utilized from other sources to aid in performing the analysis. For example, the introduction of status sensors 201, can allow use of a lock/un-lock status and container presence sensors on a top lift that is moving shipping containers in a sea port to identify container location. The status sensors 201 can include a transaction sensor such a RFID tag (passive or active) to detect the presence of and/or identification code (ID) of inventory in the proximity of or being moved/carried/handled by inventory handling equipment. The status sensors 201 can include a height sensor on the inventory handling equipment to determine the vertical or height position of inventory that has been placed or picked up from a stack of inventory by the inventory handling equipment. The status sensors 201 can also receive data from digital map 210 to allow an association and comparison with map information of the immediate working environment, such as a warehouse, a corridor, under the crane alongside a ship or barge in a seaport, or alongside a road or other landmark such as a light pole, building or other structure.

The status sensors 201 can further use external inventory data 303 to provide the added benefit of validating the location of inventory placement or pickup against valid records of the position of other inventory items. The inventory data 303 allows the analysis process to reduce doubt of the true location when no conflicting inventory is recorded at the same location. The dynamic nature of inventory location confirms that the equipment can or cannot move through a space that may be occupied by other inventory at that time, particularly useful with the storage of shipping containers in a sea port that are constantly being moved, stacked, and un-stacked. The external inventory data 303 can also be from one or more external databases such as a Terminal Operating System (TOS) or Terminal Management System (TMS) at a sea port, managing the inventory placement of shipping containers.

The status sensors 201 can further include ID sensors 304, such as RFID tag (passive or active), optical character recognition (OCR), bar code scanner, 'sonic signature' of container contents, or a transponder. ID sensors allow verification that the inventory that is moving is in fact the unit stored at the 'x, y, z' coordinates, thus verifying position with higher probability. When being transported by another piece of inventory moving equipment, ID sensors allow validation of the second piece of inventory moving equipment's location that can be used in the analysis process of the first piece of inventory moving equipment. One example would be in a sea port when a piece of top lift equipment approaches a stack of shipping containers to pick up the top container. The ID of the shipping container can be ascertained using ID recognition. The location of that particular shipping container is also known and verifiable in the external inventory database 303.

The status sensors 201 might further include the use of the data sent by the external position/status sensors 202 via some communication devices as described with respect to FIG. 2. Through communication, these sensors become virtual sensors to the navigation fusion and decision-making module 211. These data, being either signals or pieces of information, can provide additional support to data correlation that can be used by the analysis methods employed in the data correlation processing module 310 for ascertaining qualities, confidence levels, or statistical properties of the position data received by the navigation fusion and decision-making module 211.

Data fusion priority decision module 311 receives the data correlation results from the processing module 310 and determines the data fusion priorities based on a set of predetermined statistical and rule-based decision making algorithms. The possible algorithms in different embodiments may include: statistic tests, probability analysis, and data voting logic, fuzzy logic rules, or other knowledge-based logics. The priority decision typically depends on the data qualities and statistical properties reported by the data correlation results. The priority decision can also be a function of historical or external information. The resultant data fusion priorities may include a list of the position data. In some other embodiments, the fusion priorities may include weighting factors associated to each of the selected position solutions from various positioning sensing systems or algorithms.

Typically data and sensor fusion can take place at different data levels, each with its preferred fusion techniques. For example, signal-level fusion decreases the covariance of the sensory data where filtering and estimation techniques are often used. Feature-level fusion combines features derived from signals or images into representations where mapping oriented fusion methods are often used. Symbol-level fusion allows information to be fused at an abstraction level to support decision-making where behavior-oriented and machine learning methods can be used.

Since embodiments of the current invention are not restricted to a single fusion method, the data fusion method/filter selection module 312 in FIG. 3 will decide which data fusion technique or techniques are used for data fusion computation. The selection module 312 makes a decision based on the data correlation results from module 310 and the data priorities from module 311 using predetermined logics by applying information-based (neural networks, voting logic, figures of merit, data cluster) and/or parametric (Bayesian, physical model), or cognitive-based (knowledge-based, fuzzy-set) method. For some embodiments, only one fusion method candidate exists. In such cases, no selection of method would be made. For most embodiments, the outputs of this module 312 can also include filter parameters, or algorithm coefficients that would be required for the subsequent fusion computation in data fusion computation module 313.

The data fusion computation module 313 determines the real-time calibrated position with high confidence and accuracy based on the fusion method(s) selected by module 312, with coefficients and parameters provided by modules 311 and 312, using data and parameters from 310. The candidate method of data fusion can be different with different embodiments. Those candidate method(s) can include: applying a weighted sum from the selected position data, employing multiple-mode Kalman filters, or other similar filters, to the selected data; or incorporating heuristic fuzzy filter, extended Kalman filters (adaptive, or heuristic), or neural networks, and their combinations based on the decision of the data fusion method/filter decision 312. The resultant real-time calibrated position is the "optimal" position data based on an intelligent data fusion from the results of multiple positioning techniques. This real-time calibrated position is typically forwarded to the data storage medium 215. In another embodiment, additional input from the noise identification module 314 is also used in the data fusion computation 313.

In one embodiment, an iterative position validation module is implemented in the data fusion computation module 313.

This position validation module will send the resulting real-time calibrated position back to the data correlation processing module 310 to re-assess the associated data quality and statistical properties. The computational process described above can be performed repeatedly until a highly confident position is derived and output as a real-time calibrated position that can also be stored in the data storage medium 215.

Figure 4:
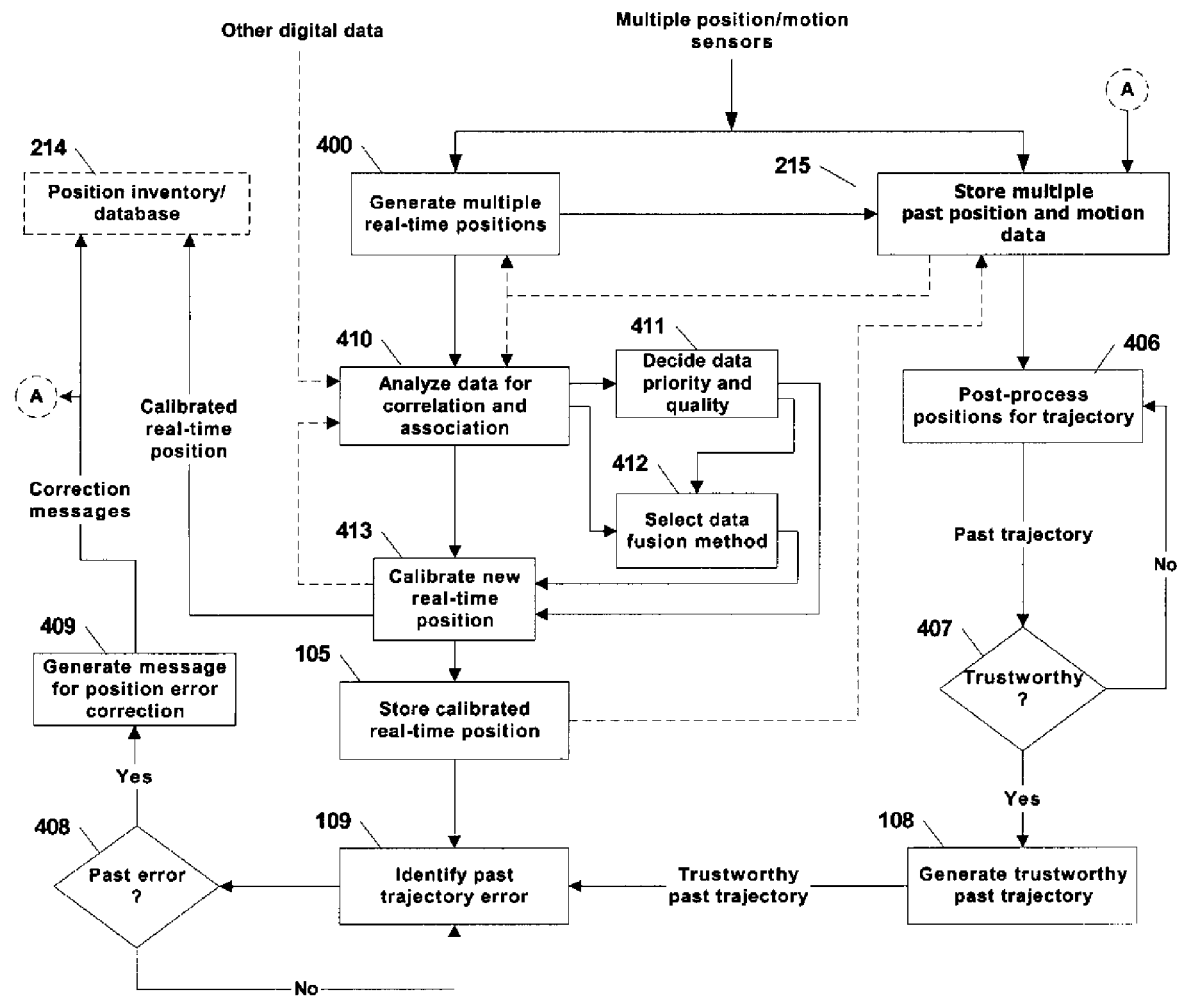
FIG. 4 is a flowchart showing more details of the method of FIG. 1 for calibrating real-time position data and providing past trajectory determination.

FIG. 4 is a flowchart illustrating the details of the method of FIG. 1 for calibrating real-time positions and providing past trajectory determination. Multiple real-time positions are generated in step 400 using inputs from multiple position/motion sensors. The sensors can employ a variety of integration filters or data fusion algorithms associated with the specific sensors or operating conditions. Appropriate position and motion data are then stored in the database in step 215. At the same time, multiple position data generated by step 400 are sent to step 410 for data analysis. Step 410 uses appropriate statistical or logic methods to produce indexes or numbers indicating the quality of each position data as described in FIG. 1 and FIG. 3. In some embodiments, external digital data that are related to the position data, positioning sensors, or item tracked, will be used as constraints in the process of data analysis in step 410. The results from data association and correlation analysis in step 410 are then passed on to step 411 to determine the data priorities and other parameters that will be used in the data fusion processing in step 413. A single data fusion method or a combination of different fusion techniques are selected in step 412 based on the results from step 410 data correlation and step 411 data priority using predetermined logics and rules. Step 413 applies the selected data fusion techniques containing mathematical formulas, estimation filters, and logic to generate in real-time a calibrated position that is more accurate than any of the individual positioning or integration techniques in step 400 can produce. The resultant calibrated real-time position is forwarded to step 214 as inputs to an external position or inventory database, and to step 105 which stores the calibrated real-time position. In another embodiment, the stored calibrated real-time position of step 105 is also forwarded to step 215 which stores multiple past position and motion data.

The steps in 410, 411, 412 and 413 of FIG. 4, thus, provide for calibrating real-time positions of a mobile object using a combination of the following techniques: data and feature analysis, filtering and estimation, decision making, and data fusion. Although described with certain steps, database, and I/O configurations in FIGS. 1-4, it is understood that combinations of steps or variations can be provided. In some embodiments, a few steps in 410, 411, 412, and 413 can be combined or eliminated.

In step 406, appropriate post-processing techniques are used to generate a new past trajectory, often segment by segment. In various embodiments, such post-processing positioning techniques may employ some of the following techniques: model-based adaptive filters, model and noise identification algorithms, data alignment and trajectory matching techniques, neural network or fuzzy logic sets, as well as linear and nonlinear statistical regression techniques. The post-processing positioning techniques in step 406 generate past positions that are more accurate or of higher confidence level than that from any of the stored past positions. The resultant post-processed trajectory is then sent to step 407 to determine if it is within an acceptable trustworthiness region, and if not the data is sent back to step 406 for re-post-processing, and then for re-comparison in step 407. If the data is within an acceptable trustworthiness area after a number of iterations, the data is used to generate a trustworthy past trajectory. This process of constructing trustworthy past trajectory is typically accomplished one small segment at a time as described with respect to FIG. 1.

Step 109 retrieves the corresponding segment of the calibrated real-time position data from storage in step 105 and trustworthy past trajectory data from step 108 and through an iterative process identifies past position errors. If the errors are found to be outside acceptable limits in step 408, the past position database 105 is updated with the corrected position errors. In addition, once step 408 has determined that a past error exists, the error indication is forwarded to step 409 which generates a message for position error correction. The correction messages are then forwarded to an external position and inventory database to support subsequent inventory corrections or to provide warnings to operators in step 214. It is understood that, with the same correction principle, errors in the past position data from a positioning technique in step 400 or other position system can also be identified and corrected in the same manner as long as that data is stored in step 215.

The methods of FIG. 4, thus, provide for continuously calibrating real-time positions and providing past trustworthy trajectory of a mobile object using multiple position systems and positioning techniques. Although described with certain steps, with certain database designs, and with various external and internal configurations in FIG. 4, it is understood that combinations of steps or variations can be provided. In addition, various steps in FIG. 4 can be realized using software or programming logic within one processor unit, or distributed in a number of processor units. For example, error correction steps 215 and 407 can be programmed in the same processor unit as data fusion steps 410, 411, 412 and 413. In an alternative hardware configuration, the data fusion steps 310-413 and a number of positioning techniques in step 400 can be realized as several software modules using one processor unit.

Figure 5:
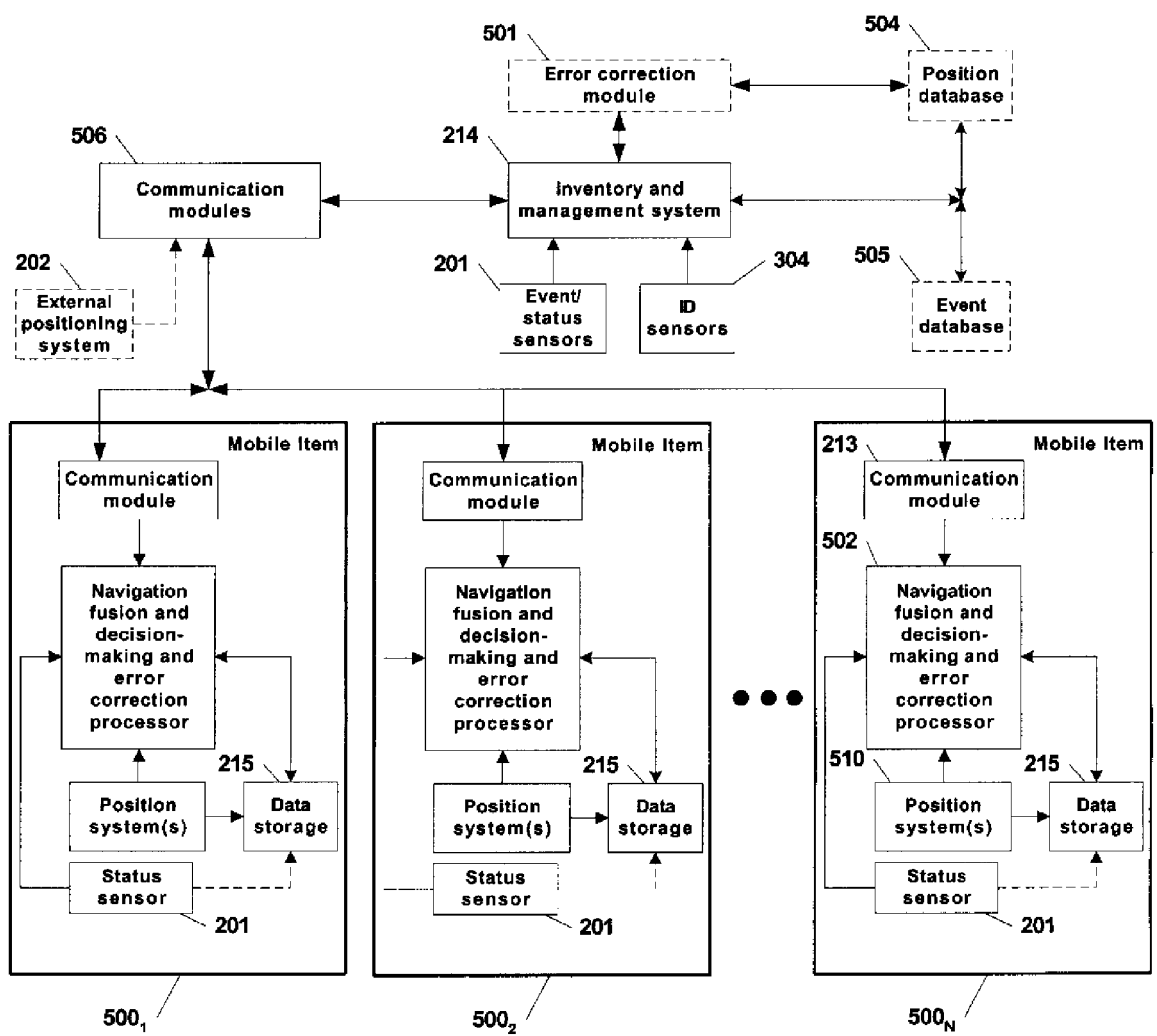
FIG. 5 shows a block diagram of a system architecture for embodiments of the present invention for tracking real-time positions and correcting past position errors of multiple mobile items using multiple positioning techniques with decentralized computation.

FIG. 5 is a block diagram of a system architecture for tracking real-time positions and correcting past position errors of multiple mobile items ($500_1$-$500_N$) using multiple positioning techniques with decentralized computation. The inherent values of a decentralized computational environment are many in that at least: 1) the mobile items can become more autonomous in performing their tracking functions by utilizing the on-board processing, complex analytical software processes and real-time input from sensors to compute a position in real-time locally; 2) the information transmitted from the mobile items becomes, by nature, a much smaller set of data containing only the positioning, error reporting, event logging and other data as required, thus minimizing the impact on the wireless/wired communications network; 3) should a problem develop with the communications network, the mobile items can continue to function with some degree of autonomy depending on operational parameters until communications are re-established, and at that time transmit their data to the inventory and management system; 4) there are little or no time delays such as those that might be created by a slow communications network, interruptions in communications, or a congested communications network due to a high quantity of mobile items needing to utilize the communications network to constantly relay positioning and other data in a raw, unprocessed format. This can become critical in an environment such as a sea port container yard with hundreds of mobile items $500_{1-N}$ such as terminal tractors (UTRs or jockey trucks), top lifts, side lifts, straddle carriers, reach stackers, fork lift trucks, rubber tired gantries (RTGs), rail mounted gantries (RMGs), automatic stacking cranes, ship to shore (STS) or quay cranes that are moving large volumes of inventory and transiting over many hundreds of acres of land requiring many constantly changing position updates.

In this embodiment, FIG. 5 depicts such an operational environment with multiple mobile items $500_{1-N}$ each processing the data required to calculate their own position to a highly accurate level as described in detail in previous figures. These mobile items might be container handling equipment in a sea port container yard as described above. The need to accurately and consistently track the position of containers by tracking the vehicles moving/handling the containers is paramount.

In this embodiment of FIG. 5, a mobile item $500_{1-N}$ will have on-board all the components necessary to provide accurate position tracking. It is understood that the navigation and decision-making and error correction processor 502 inside mobile items $500_{1-N}$ can be one processor unit or its functions can be distributed into multiple processors. In some embodiments, the error correction function may be totally removed from the mobile items $500_{1-N}$. It is also understood that positioning system(s) 510 can be any combination of positioning sensors, systems and positioning techniques described earlier in FIG. 3. Examples of the position sensors or systems are: DGPS #1 301, INS 302, DGPS #2 303, motion sensors 304, attitude sensors 305 and RTK 306. Examples of the positioning techniques are: loosely-coupled DPGS/INS integration 206, tightly coupled DPGS/INS integration 207, and dead reckoning integration 309. It is also understood that, in some embodiments, a number of positioning techniques can be implemented as software modules residing in the same processor as the navigation fusion and decision making processor and error correction processor 502; and further, data storage 215 can reside entirely on-board the mobile item $500_1$ or in the inventory and management system 214 or a combination of the two. The position system(s) 510, as described in detail in previous figures, provides the position data to the navigation and decision-making and error correction processor 502. Also provided to processor 502 is data from status sensors 201, described in detail in previous figures. Data from position system(s) 510 and status sensor 201 are also forwarded to data storage 215 for later use by the processor 502 or other implicit on-board applications. It is also understood that positioning data from external positioning system(s) 202, such as RTLS, can be forwarded via the communications modules 506 and 213 to the mobile item $500_1$ to become a virtual part of the positioning system $500_1$. Similarly in some embodiments, data from external event/status sensors 201, ID sensors 304, or relevant inventory data from 214 can also be forwarded via communications modules 506 to module 213 in the mobile items $500_{1-N}$ to support the data correlation module 310 within the processor 502.

The position data output from modules $500_{1-N}$ is sent via the communications modules 213 to module 506 and then to the inventory and management system 214. In inventory system 214 the position data can be aggregated with data from ID sensors 304, and data from event/status sensors 502 to provide a real-time position of the mobile items $500_{1-N}$ and the inventory that it may have been handling/placing/moving. In some embodiments, position data might be stored in an external position database 504 and event data might be stored in an external event database 505. Conversely, each of these databases 504 and 505 may share information to the inventory and management system 214 for further refinement of inventory/mobile item $500_1$ location information. In addition, position data from the position database 504 might be shared with yet another error correction module 501. In another embodiment, the inventory and management system 214 will also utilize error correction data from the error correction module 501 to further refine the location of mobile items $500_{1-N}$ based on the data stored in the event database 505.

Figure 6:
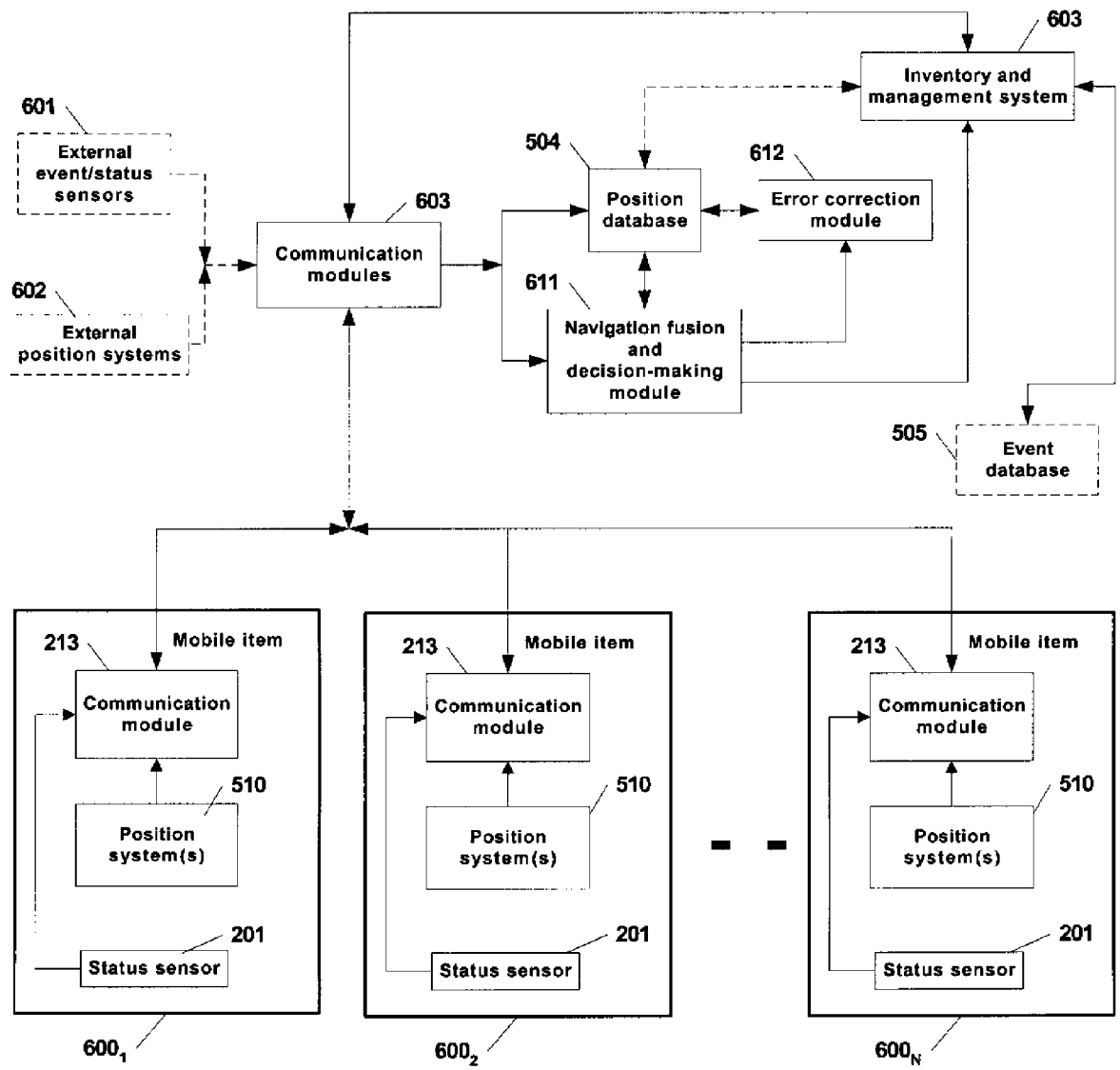
FIG. 6 shows a block diagram of a system architecture similar to FIG. 5, but with computational diagnostic, analytical and data storage functions performed in a central location.

FIG. 6 is a block diagram of a system architecture for tracking real-time positions and correcting past position errors of multiple mobile items ($600_1$-$600_N$) using multiple positioning techniques with centralized computation. This embodiment is similar to that of FIG. 5 in many ways in that the same basic architecture can be incorporated at a centralized location. The primary difference from FIG. 5 is that all computational, diagnostic, analytical and data storage functions for all mobile items are performed in a central location and not in the individual mobile items $600_{1-N}$.

As with the embodiment in FIG. 5, it is understood that the centralized navigation and decision-making module 611 can reside in one processor or be distributed to multiple processors. It is also understood that positioning system(s) 510 in each mobile item $600_{1-N}$ can be any combination of sensors, positioning systems and positioning techniques as described in FIG. 3 and FIG. 5. In the embodiment of FIG. 6, data storage does not reside on-board the mobile items $600_{1-N}$ but rather at the centralized location and can reside entirely in one database or separate databases or even across multiple databases. However, other embodiments may include smaller localized data storage 215 on-board the mobile items $600_{1-N}$ for providing temporary storage for specific situations such as a data buffer for communication failure.

As with the decentralized example of FIG. 5, the centralized computation example has intrinsic values and shortcomings that are notable. The inherent values of a centralized computational environment are worthy of mention in that: 1) the cost per mobile item can be less since processing hardware and software do not reside in the mobile items $600_{1-N}$ but rather in a central location; 2) more powerful processors and a larger number of processors can be utilized to manage the processing loads at the central stationary location; 3) updating software is faster/easier at a central location than trying to update many mobile items $600_{1-N}$.

However, it should be noted that there are some limitations systemically to a centralized system, most notably; 1) the entire system is heavily dependent on a highly reliable and robust communications system in that: a) should the communications system fail, mobile items $600_{1-N}$ may be unable to transmit their positioning data for evaluation by the centralized system; b) the amount of data transmitted by each mobile item $600_{1-N}$ to the centralized location and the amount of data that now must be transmitted back to the mobile items $600_{1-N}$ from the centralized location is typically greater; 2) the processor(s) required at the centralized location, whether one or many, must have much more processing power to handle the computational needs of the entire fleet of remote items $600_{1-N}$, which can be significant; 3) therefore, more centralized processing redundancy can be employed to lessen the likelihood that a failure in centralized processing does not totally disable the entire network.

In the mobile units $600_{1-N}$ of the embodiment of FIG. 6, the position system(s) 510 provides position data directly to the communication module 213 along with the data from the status sensors 201. Through the communications modules 213 and 603, the data is sent to the centralized system, stored centrally in the position database 504. The position data in database 504 is used by the centralized navigation and decision-making module 611 for computing a highly accurate position, and by the centralized error correction module 612 for identifying and correcting past errors. The centralized computational modules 611 and 612 are very similar in principle to the respective decentralized computational modules 211 and 212 (within the processor 502) of a mobile item in a decentralized configuration of FIG. 5. The main difference between them is that the centralized computational modules 611 and 612 need to calibrate real-time positions and correct past position errors of all mobile items involved, and the decentralized system only needs to track one mobile item. However, with respect to tracking a single item, the computational modules for both configurations perform the same computational processes on the data as the mobile items $600_{1-N}$, as described in previous figures. In one or more embodiments, the centralized system may also receive inputs from external event/status sensors 601. The sensors 601 might incorporate an external position system(s) such as RTLS as part of the centralized positioning system that provides position data to multiple mobile items.

In one embodiment, once the centralized navigation fusion and decision-making module 611 has resolved a real-time position that it believes to be of the highest confidence of the items $600_{1-N}$, it will send it to the position database 504 for storage; and it will also send it to the centralized error correction module 612 for past error identification and correction for item $600_1$. In another embodiment, the calibrated position information can be transmitted back to the mobile items $600_{1-N}$ to be used by the position system(s) 510 as a validation of its position.

It is understood that the decentralized configuration mentioned in FIG. 5 and the centralized configuration in FIG. 6 can be combined or split into a number of different hybrid configurations. In one embodiment, the mobile items $600_1$, $600_2, \ldots, 600_N$ in the centralized configuration of FIG. 6 is replaced by the mobile items, $500_1, 500_2, \ldots, 500_N$ of the decentralized configuration of FIG. 5. Under this specific hybrid configuration, each mobile item retains its capability of determining its calibrated real-time position as well as correcting past errors using computational modules 502. In addition, the centralized navigation fusion and decision-making module 611 can perform a secondary or parallel centralized real-time position calibration for multiple items. The centralized modules 611 and 612 can also perform a secondary processing using the data from the external position system 602 to validate the calibrated real-time position and/or error corrections reported by the individual item, for example, $500_1$. In another embodiment, a mixture of both types of mobile items, for examples, $500_1, 500_2, \ldots, 500_N, 600_1, 600_2, \ldots, 600_N$, are co-existent in a centralized configuration similar to that in FIG. 6 with centralized navigation fusion and decision-making module 611, and centralized error correction module 612. In such a hybrid configuration embodiment, there is centralized computational capability for mobile items like $600_1, 600_2, \ldots, 600_N$, but the centralized system and modules can still support mobile items like $500_1, 500_2, \ldots, 500_n$. In another variation of the above embodiment, the decentralized navigation fusion and decision-making modules of some or all of the mobile items $500_1, 500_2, \ldots, 500_n$, do not contain the decentralized error correction module 212. In practice, the configuration of each mobile item can best be determined by operational needs, communication bandwidth, and individual cost factors. Although only a few hybrid configurations are described above, it is understood that combinations or mixtures or distributions of items and modules in FIG. 5, FIG. 6, and FIG. 3 can be provided for this invention.

Although the present invention has been described above with particularity, this was merely to teach one of ordinary skill in the art how to make and use the invention. Many additional modifications will fall within the scope of the invention, as that scope is defined by the following claims.

What is claimed is:

1. A position tracking system comprising:
a plurality of position sensor systems on board a mobile object, each position sensor system including at least one sensor that provides signals related to a location of the mobile object and determining position data for the mobile object; and
a fusion and decision-making module configured to receive the position data from each of the position sensor systems, perform an analysis to determine the quality of each said position data by correlating the position data, set a priority for each said position data, select at least one data fusion method from a list of pre-determined data fusion methods each enabling combining the said position data in a different manner based on the determined quality and the set priority, and combine the position data using the selected at least one data fusion method to provide calibrated position data for the mobile object, whereby the calibrated position data is with a higher degree of accuracy than the position data provided by each of the position sensor systems.

2. The system of claim 1, further comprising:
a data storage unit for storing the calibrated position data provided by the fusion and decision-making module as past calibrated position data and at least part of the position data from at least one of the position sensor systems as past position data,
wherein the fusion and decision-making module further receives the past position data from the data storage unit and performs the analysis using the past position data.

3. The system of claim 2, wherein the fusion and decision-making module generates a position data and iteratively adjusts the generated position data based on the position data from the position sensor systems and the past position data from the data storage unit using mathematical formula a number of times until the generated position data is statistically trustworthy based on a predetermined criteria, and wherein the fusion and decision-making module further outputs the said generated position data as the calibrated position data.

4. The system of claim 1, wherein the position sensor systems comprise at least two of the following: a tightly coupled DGPS/INS integration system, a loosely coupled DGPS/INS integration system, a DGPS, a dual antenna DGPS, a DGPS integrated with motion sensors, a DGPS integrated with dead reckoning sensors, an INS integrated with dead reckoning sensors, a Real Time Kinematic (RTK) DGPS, a Radio Frequency Identification (RFID)-tag-based triangulation positioning system an imaging processing-based locating system with digital map, a Real Time Locating System (RTLS) with a DGPS validation algorithm, and an RTLS and DGPS integration system.

5. The system of claim 1, wherein the fusion and decision-making module further uses information from at least one of the following, an RFID tag, a compass, a magnetometer, an altimeter, a laser, a camera, a radar, and an RF beacon transmitter, in the said analysis.

6. The system in claim 1, wherein the fusion and decision-making module further uses at least one of the following data to perform the said analysis: (a) a digital map, (b) rules relating to an operation of the mobile object, (c) inventory information indicating a location of the mobile object, (d) an output from a sensor providing information identifying the mobile object, (e) an output from a sensor indicating the mobile object's arrival at a specific location, and (f) an output from a sensor indicating an occurrence of a specific operation relating to the mobile object.

7. The system of claim 1, wherein the fusion and decision-making module further uses operational rules related to the position data in the analysis, the said operational rules including at least one of the following data: identification codes, storage height, storage row number, storage isle number, surrounding environment that can cause movement blockage, a dynamic map of current inventory, and positions of nearby vehicles.

8. The system of claim 1, wherein the fusion and decision-making module further generates candidate positions and combines the generated candidate positions with the position data from each of the position sensor systems.

9. The system of claim 8, wherein the fusion and decision-making module generates the candidate positions by using filters comprising a recursive state estimation filter.

10. The system of claim 9, wherein the recursive state estimation filter comprises a Kalman filter.

11. The system of claim 1, wherein the pre-determined data fusion methods include at least one of the following: a probabilistic data association method, a weighted summation, fuzzy logic rules, neural network, an information-based algorithm, a cognitive-based algorithm, and rule based voting.

12. A position tracking system comprising:
a plurality of position sensor systems on board a mobile object, each position sensor system including at least one sensor that provides signals related to a location of the mobile object and determining position data for the mobile object;
a fusion and decision-making module configured to receive the position data from each of the position sensor systems, perform an analysis to determine the quality of each of the said position data by correlating the position data, set a priority for each of the said position data, select a single data fusion method or a combination of data fusion methods from a list of pre-determined data fusion methods, and combine the position data using the selected at least one data fusion method to provide calibrated position data for the mobile object;
a data storage unit for storing the calibrated position data provided by the fusion and decision-making module as past calibrated position data and at least part of the position data from at least one of the position sensor systems as past position data;
an error correction module for receiving the past calibrated position data and the past position data from the data storage unit, generating trustworthy past position data, and determining errors in the past calibrated position data by comparing the past calibrated position data with the trustworthy past position data;
whereby the calibrated position data is with a higher degree of accuracy than the position data provided by each of the position sensor systems and the errors in the past calibrated position data can be corrected to further improve the position tracking accuracy.

13. The system of claim 12, wherein the fusion and decision-making module generates a position data and iteratively adjusts the generated position data based on the position data from the position sensor systems and the past position data from the data storage unit using mathematical formula a number of times until the generated position data is statistically trustworthy based on a predetermined criteria, and wherein the fusion and decision-making module further outputs the said generated position data as the calibrated position data.

14. The system of claim 12, wherein the position sensor systems comprise at least two of the following: a tightly coupled DGPS/INS integration system, a loosely coupled DGPS/INS integration system, a DGPS, a dual antenna DGPS, a DGPS integrated with motion sensors, a DGPS integrated with dead reckoning sensors, an INS integrated with dead reckoning sensors, an RTK DGPS, an RFID-tag-based triangulation positioning system, an imaging processing-based locating system with digital map, Real Time Locating System (RTLS) with a DGPS validation algorithm, and an RTLS and DGPS integration system.

15. The system of claim 12, wherein the fusion and decision-making module further uses information from at least one of the following, an RFID tag, a compass, a magnetometer, an altimeter, a laser, a camera, a radar, and an RF beacon transmitter, in the said analysis.

16. The system in claim 12, wherein the fusion and decision-making module further uses at least one of the following data to perform the said analysis: (a) a digital map, (b) rules relating to an operation of the mobile object, (c) inventory information indicating a location of the mobile object, (d) an output from a sensor providing information identifying the mobile object, (e) an output from a sensor indicating the mobile object's arrival at a specific location, and (f) an output from a sensor indicating an occurrence of a specific operation relating to the mobile object.

17. The system of claim 12, wherein the fusion and decision-making module further uses operational rules related to the position data in the analysis, the said operational rules including at least one of the following data: identification codes, storage height, storage row number, storage isle number, surrounding environment that can cause movement blockage, a dynamic map of current inventory, and positions of nearby vehicles.

18. The system of claim 12, wherein the fusion and decision-making module further generates candidate positions and combines the generated candidate positions with the position data from each of the position sensor systems.

19. The system of claim 18, wherein the fusion and decision-making module generates the candidate positions by using filters comprising a recursive state estimation filter.

20. The system of claim 12, wherein the pre-determined data fusion methods including at least one of the following: a probabilistic data association method, a weighted summation, fuzzy logic rules, neural network, an information-based algorithm, a cognitive-based algorithm, and rule based voting.

21. The system of claim 12, wherein the error correction module provides the generated trustworthy past position data to the data storage unit to provide additional past position data.

22. The system in claim 12, wherein the error correction module further uses at least one of the following data to generate the trustworthy past position data: (a) a digital map, (b) rules relating operation of the mobile object, (c) inventory information indicating a location of the mobile object, (d) an output from a sensor providing information identifying the mobile object, (e) an output from a sensor indicating the mobile object's arrival at a specific location, and (f) an output from a sensor indicating an occurrence of a specific operation relating to the mobile object.

23. The system in claim 12, wherein the error correction module generates the trustworthy past position data by iteratively generating new past position data based on the past calibrated position data and the past position data from the data storage unit using mathematical formula a number of times until the generated new past position data is statistically trustworthy based on a predetermined criteria and outputting the generated past position as the trustworthy past position data.

24. A position tracking system comprising:
a plurality of position sensor systems on board a mobile object, each sensor system receiving signals from multiple sensors including a Global Positioning System (GPS) sensor and an Inertial Navigation System (INS) sensor that provide signals indicating a location of the mobile object that are used to determine position data for the mobile object, wherein the position sensor systems comprise:
a loosely-coupled GPS/INS system receiving signals from at least the GPS and INS sensors, wherein GPS data and INS data are independently provided as an output; and
a tightly-coupled GPS/INS system receiving signals from at least the GPS and INS sensors and combining the signals in an integrated manner through a Kalman filter to provide an output;
a fusion and decision-making module for receiving the position data output from each of the position sensor systems, performing an analysis to enable combining the position data outputs to provide position solution data with a higher degree of accuracy than the position data provided from a single one of the position sensor systems, and combining the data according to the analysis.

25. The system of claim 24, further comprising:
a data storage unit for storing at least part of the position data from each of the position sensor systems as past position data,
wherein the fusion and decision-making module further receives the past position data from the data storage unit and performs the analysis using the past position data.

26. The system of claim 25, wherein the fusion and decision-making module provides an output after iteratively adjusting data from the position sensor systems and the data storage unit using mathematical formula a number of times until data obtained from the mathematical formula is statistically trustworthy based on a predetermined criteria.

27. The system of claim 24, wherein the fusion and decision-making module performs filtering of the position data to provide the calibrated position data.

28. The system of claim 27, wherein the filter uses a method including at least one of the following: a probabilistic data association method, a recursive state estimation method, fuzzy logic rules, neural network, an information-based algorithm, a cognitive-based algorithm, and rule based voting.

29. The system of claim 24, further comprising:
an error correction module, wherein the fusion and decision-making module provides the calibrated position data to the error correction module, and wherein the error correction module further receives the past position data from the data storage unit and performs an analysis to provide trustworthy past position data.

* * * * *